(12) United States Patent
Chafle et al.

(10) Patent No.: US 12,470,565 B1
(45) Date of Patent: Nov. 11, 2025

(54) FINE-GRAINED ACCESS TO SYSTEM COMMANDS RUN VIA AN INSTALLED AGENT APPLICATION

(71) Applicant: CrowdStrike, Inc., Sunnyvale, CA (US)

(72) Inventors: Suraj Chafle, San Jose, CA (US); Robert Batzloff, Danville, CA (US); Emily Thompson, Apex, NC (US); Ashley Federoff, Los Angeles, CA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/975,533

(22) Filed: Dec. 10, 2024

(51) Int. Cl.
  *H04L 9/40* (2022.01)
(52) U.S. Cl.
  CPC ................................ *H04L 63/105* (2013.01)
(58) Field of Classification Search
  CPC ................................................. H04L 63/105
  See application file for complete search history.

(56) References Cited

U.S. PATENT DOCUMENTS

| | | | |
|---|---|---|---|
| 6,085,227 A | 7/2000 | Edlund et al. | |
| 6,513,120 B2 | 1/2003 | Kanzawa et al. | |
| 9,135,457 B1 | 9/2015 | Arnaudov | |
| 12,021,888 B1 * | 6/2024 | Reed | H04L 63/1425 |
| 12,058,160 B1 * | 8/2024 | Erlingsson | G06F 16/906 |
| 12,095,796 B1 * | 9/2024 | Godefroid | G06F 9/542 |
| 12,118,401 B1 * | 10/2024 | Mystetskyi | G06F 21/6218 |
| 12,126,643 B1 * | 10/2024 | Skarphedinsson | H04L 63/1441 |
| 12,130,878 B1 * | 10/2024 | Nanduri | H04L 63/10 |
| 12,130,909 B1 * | 10/2024 | Ross | G06F 16/90 |
| 12,135,627 B1 * | 11/2024 | Sharma | G06F 11/3072 |
| 12,204,959 B1 * | 1/2025 | Kelly | H04L 63/1433 |
| 12,210,726 B1 * | 1/2025 | Loo | H04L 67/34 |
| 2014/0053072 A1 * | 2/2014 | Guo | H04L 41/28 715/736 |
| 2018/0103066 A1 * | 4/2018 | Hussain | H04L 41/28 |

(Continued)

FOREIGN PATENT DOCUMENTS

| | | | |
|---|---|---|---|
| JP | H0743692 B2 | 5/1995 | |
| JP | 177063 A | 10/2006 | |

(Continued)

*Primary Examiner* — Stephen T Gundry
(74) *Attorney, Agent, or Firm* — Womble Bond Dickinson (US) LLP

(57) ABSTRACT

The present disclosure provides techniques for fine-grained access to system commands run via an installed agent application. A processing device receives, from an agent application, a user identifier and an indication of an agent application command with respect to a target endpoint, wherein the agent application command is included in a plurality of agent application commands assigned to a first user type that is different from a second user type corresponding to the user identifier. The processing device maps the agent application command to a permission level assigned to the agent application command. The processing device determines, based on the mapping, that the permission level is assigned to the user identifier. The processing device enables, based on the determination, the agent application to execute the agent application command with respect to the target endpoint.

20 Claims, 5 Drawing Sheets

(56) References Cited

U.S. PATENT DOCUMENTS

| | | | |
|---|---|---|---|
| 2018/0232262 A1* | 8/2018 | Chowdhury | G06F 9/541 |
| 2021/0314342 A1* | 10/2021 | Oberg | H04L 63/20 |
| 2023/0236991 A1* | 7/2023 | Yang | H04L 67/564 |
| | | | 710/6 |
| 2023/0328130 A1* | 10/2023 | Thompson | H04L 63/0807 |
| | | | 709/208 |
| 2024/0320016 A1* | 9/2024 | Bond | G06F 9/54 |
| 2024/0388584 A1* | 11/2024 | Carru | H04L 63/102 |
| 2024/0404687 A1* | 12/2024 | Bell | G06Q 10/0633 |
| 2024/0404712 A1* | 12/2024 | Bell | G06N 3/045 |
| 2025/0021447 A1* | 1/2025 | Mitkar | G06F 11/1458 |
| 2025/0053683 A1* | 2/2025 | Hockey | G06Q 40/125 |

FOREIGN PATENT DOCUMENTS

| | | | |
|---|---|---|---|
| JP | 4030548 B2 | 1/2008 |
| JP | 4760150 B2 | 8/2011 |
| JP | 5195564 B2 | 5/2013 |

\* cited by examiner

US 12,470,565 B1

FINE-GRAINED ACCESS TO SYSTEM COMMANDS RUN VIA AN INSTALLED AGENT APPLICATION

TECHNICAL FIELD

Aspects of the present disclosure relate to cybersecurity, and more particularly, to fine-grained access to system commands run via an installed agent application.

BACKGROUND

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
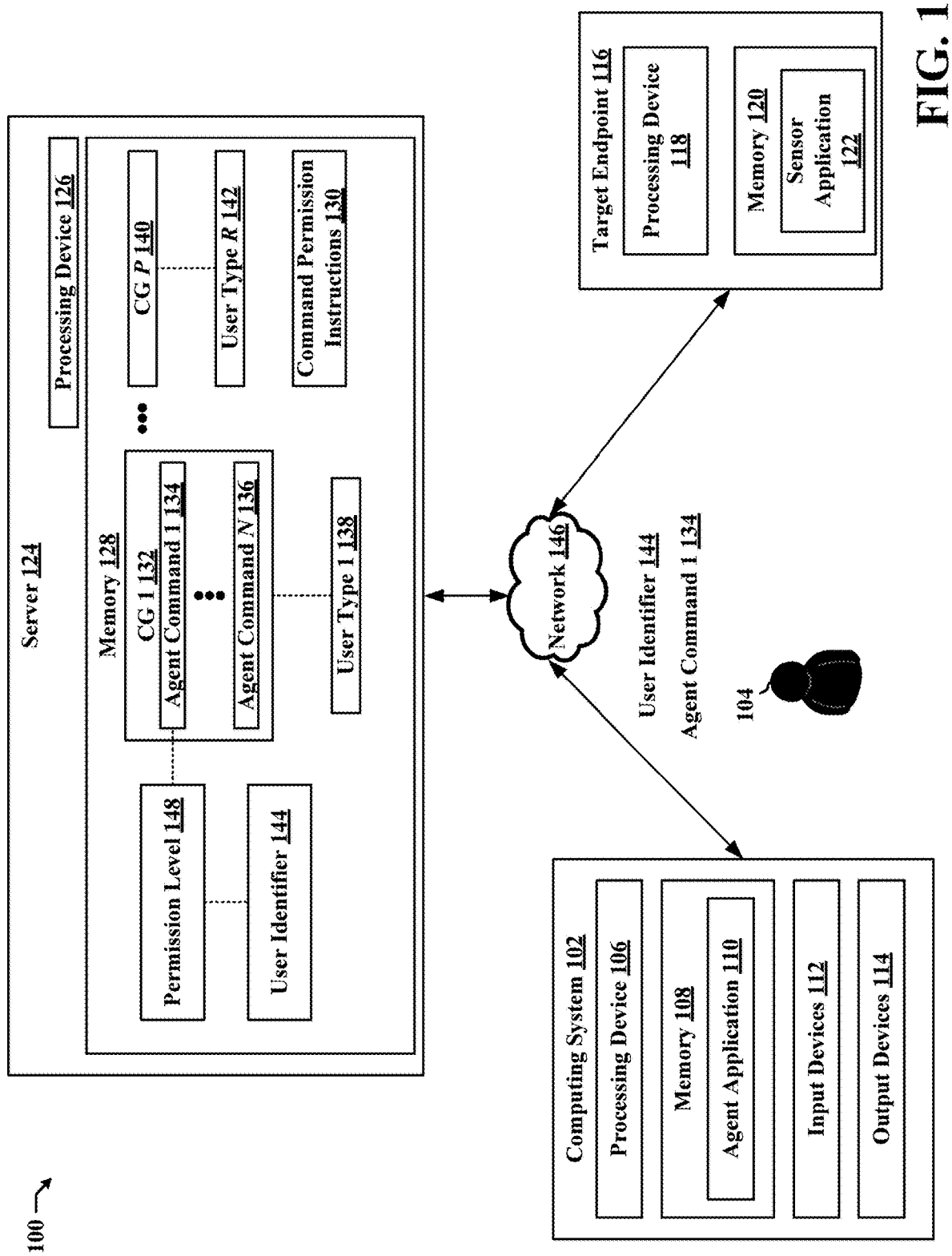
FIG. 1 is a block diagram that illustrates an example of a system for fine-grained access to system commands in accordance with some aspects of the present disclosure.

An organization may install an agent application on endpoints (e.g., desktop computing devices, laptop computing devices, tablet computing devices, servers, etc.) for cybersecurity purposes. In an example, a computing device operated by a user may connect, via a first agent application, to a target endpoint (which may execute a second agent application or a sensor application, described below) to respond to a security incident or another incident. The first agent application may provide administrative shell permissions and may maintain a detailed audit log of actions taken at the target endpoint. The first agent application may also include sets of built-in commands (referred to hereafter as "agent application commands," "groups of agent application commands," "sets of agent application commands," etc.) that may be used to gather information about a threat, such as listing running processes, extracting files, querying an operating system (OS) registry, etc. The sets of built-in commands may also include other functionality, such as state modifying commands, script running commands, etc.

A group of agent application commands may be assigned to a particular type (i.e., role) of a user for security and efficiency purposes. In an example, a first group of agent application commands may be assigned to a read-only analyst user, a second group of agent application commands may be assigned to an active responder user, and a third group of agent application commands may be assigned to an administrator user. In the example, the first group of agent application commands may include read-only response commands, the second group of agent application commands may include the first group of agent application commands, as well as file extraction commands, state modifying commands, and restricted script running commands, and the third group of agent application commands may include the first group of agent application commands and the second group of agent application commands, as well as custom script running commands, upload commands, and executable running commands.

Assigning groups of agent application commands to types of users may be associated with various deficiencies. For instance, some users may have responsibilities that do not neatly fit into one of the aforementioned types of users. In an example, a read-only analyst user may have a responsibility that entails being able to run one command (e.g., a file extraction command) from the second group of agent application commands described above, but not all of the commands (e.g., state modifying commands, restricted script running commands) from the second group of agent application commands. While an administrator may grant the read-only analyst user with access to the second group of commands, this may be undesirable from a security perspective. Furthermore, defining a unique group of agent application commands customized for the read-only analyst may be associated with computational overhead, such as maintaining a large number of groups of agent application commands at a server.

The present disclosure addresses the above-noted and other deficiencies by using a processing device to provide fine-grained access to system commands (e.g., agent application commands) run via an installed agent application. The present disclosure details assigning individual agent application commands to a permission level (as opposed to assigning a group of agent application commands to a user type). Assigning agent application commands to permission levels in this manner may provide a user with access to an agent application command (e.g., an agent application command that the user is to use as part of responsibilities of the user) without giving the user access to other agent application commands in a command group.

In an example, a processing device receives, from an agent application, a user identifier and an indication of an agent application command with respect to a target endpoint, where the agent application command is included in a plurality of agent application commands assigned to a first user type that is different from a second user type corresponding to the user identifier. The processing device maps the agent application command to a permission level assigned to the agent application command. The processing device determines, based on the mapping, that the permission level is assigned to the user identifier. The processing device enables, based on the determination, the agent application to execute the agent application command with respect to the target endpoint.

As discussed herein, the present disclosure provides an approach that improves the operation of a computer system by enabling execution of an agent application command by a user without generating new custom groups of agent application commands. For instance, vis-à-vis mapping the agent application command to a permission level assigned to the agent application command, the processing device may enable execution of the agent application command without generating a new group of agent application commands, thus conserving computing resources (e.g., memory) associated with the creation of new groups of agent application commands. In addition, the present disclosure provides an improvement to the technological field of cybersecurity by enabling users to access and execute certain agent application commands outside of their respective user type (i.e., outside of their role) without granting users complete access to a group of agent application commands outside of their respective user type/respective permission level.

FIG. 1 is a block diagram 100 that illustrates an example of a system for fine-grained access to system commands in accordance with some aspects of the present disclosure. The system may include a computing system 102. The computing system 102 may be operated by a user 104. In an example, the user 104 and the computing system 102 may belong to/be associated with an organization. In an example, the user 104 may be assigned cybersecurity related responsibilities within the organization. For instance, the user 104 may be a read-only analyst, an active responder, or an administrator in the organization. In an example, the computing system 102 may be or include a desktop computing device, a laptop computing device, a tablet computing device, a smartphone, etc. The computing system 102 may include a processing device 106 (e.g., a central processing unit (CPU), a graphics processing unit (GPU), etc.) and memory 108. The memory 108 may store an agent application 110.

In general, the agent application 110, when executed by the processing device 106, may cause the processing device 106 to connect to target endpoints to respond to cybersecurity incidents (as well as other types of incidents). For example, the agent application 110 may enable the user 104 to set forth commands with respect to the target endpoints, and the agent application 110 may cause the commands to be executed with respect to the target endpoints (e.g., via agent applications installed on the target endpoints).

The computing system 102 may include input devices 112. In an example, the input devices 112 may be or include a mouse, a keyboard, a touchscreen, a scroll wheel, a microphone, a trackpad, etc. The computing system 102 may also include output devices 114. In an example, the output devices 114 may be or include a display, a touchscreen display, a speaker, etc. In some aspects, the computing system 102 may be or include the computer system described in FIG. 5.

The system may further include a target endpoint 116. The target endpoint 116 may include a processing device 118 and memory 120. The memory 120 may store a sensor application 122. In some aspects, the sensor application 122 may be similar or identical to the agent application 110. In some aspects, the sensor application 122 may enable other agent applications (e.g., the agent application 110) to execute commands with respect to the target endpoint 116, but the sensor application 122 may not execute commands with respect to other endpoints. In an example, the sensor application 122 may facilitate the execution of commands set forth to the agent application 110 by the user 104. In an example, the target endpoint 116 may be or include a desktop computing device, a laptop computing device, a tablet computing device, a smartphone, a server, a cloud server, etc. In an example, the target endpoint 116 may belong to/be associated with the same organization as the computing system 102 and the user 104. In some aspects, the target endpoint 116 may be the computing system 102. In some aspects, the target endpoint 116 may be or include the computer system described in FIG. 5.

The system may further include a server 124 (e.g., a cloud server). The server 124 may include a processing device 126 and memory 128. The memory 128 may store command permission instructions 130. The command permission instructions 130, when executed by the processing device 126, may cause the server 124 to provide fine-grained access to system commands run via an installed agent application as described herein. In some aspects, the command permission instructions 130 may be associated with a server agent application (i.e., a server agent application) that communicates with the agent application 110 and/or the sensor application 122. In some aspects, the server 124 may be or include the computer system described in FIG. 5. In some aspects, the server 124 may belong to/be associated with the same organization as the computing system 102, the user 104, and the target endpoint 116. In some aspects, the server 124 may belong to/be associated with a first organization and the computing system 102, the user 104, and the target endpoint 116 may belong to/be associated with a second organization, where the first organization provides cybersecurity related services to the second organization.

In some aspects, the server 124 may maintain a first group of commands (referred to hereafter as a first command group (CG) 132) in the memory 128 (or in other data storage of the server 124). The first CG 132 may include a first agent application command 134 and an Nth agent application command 136, where N is a positive integer greater than one. An agent application command may be used to gather information about a threat, such as listing running processes, extracting files, querying an operating system (OS) registry, etc. The first CG 132 may be assigned a first user type 138, that is, each agent application command in the CG 132 may be assigned to the first user type 138 in order to enable users that belong to the first user type 138 to execute agent application commands in the first CG 132 with respect to an endpoint (e.g., the target endpoint 116). Users that do not belong to the first user type 138 may not be permitted to execute agent application commands in the first CG 132 with respect to an endpoint unless an agent application command in the first CG 132 has been assigned to a specific user permission level (described in greater detail below).

In an example, the first user type 138 may be a read-only analyst. In the example in which the first user type 138 is read-only analyst, the first CG 132 may include read-only response commands that perform reconnaissance with respect to an endpoint. In an example, the first user type 138 may be an active responder. In the example in which the first user type 138 is active responder, the first CG 132 may include the read-only response commands described above, as well as active responder commands, such as file extraction commands (e.g., "get" commands), state modifying commands, and certain script running commands. In an example, the first user type 138 may be administrator. In the example in which the first user type 138 is administrator, the first CG 132 may include the read-only response commands and the active responder commands described above, as well as administrator commands, such as custom script running commands, file upload commands, file download commands, and executable running commands.

The server may also maintain a Pth CG 140 in the memory 128 (or in other data storage of the server 124), where P is a positive integer greater than one. The Pth CG 140 may include different agent application commands than agent application commands of the first CG 132. For instance, the Pth CG 140 may include at least one command that is not included in the first CG 132 and/or the first CG 132 may include at least one command that is not included in the Pth CG 140. In an example, the Pth CG 140 may include read-only analyst commands, active responder commands, or administrator commands. The Pth CG 140 may be assigned an Rth user type 142, where R is a positive integer greater than one and where the Rth user type 142 is different from the first user type 138. In an example, the Rth user type 142 may be read-only analyst, active responder, or administrator.

Aspects pertaining to fine-grained access to system commands run via an installed agent application are now described. In an example, the user 104 wishes to obtain permission to execute an agent application command that is not included in a CG corresponding to a user type of the user 104 or another user may wish to grant permission to the user 104 to execute an agent application command that is not included in a CG corresponding to a user type of the user 104. For instance, the user 104 may belong to the Rth user type 142 (corresponding to the Pth CG 140) and the user 104 may wish to obtain permission to execute the first agent application command 134 of the first CG 132 (corresponding to the first user type 138).

The server 124 may obtain an identifier for the user 104 (referred to hereafter as the user identifier 144) and an indication of the first agent application command 134. In an example, the computing system 102 may receive user credentials for the user 104 as input from the user 104. The user credentials may include the user identifier 144 and a password of the user 104. The computing system 102 may transmit, via a network 146 (e.g., the Internet), the user credentials to the server 124. The server 124 may receive, via the network 146, the user credentials. The server 124 may validate the user credentials and establish a session with the computing system 102. In some aspects, the computing system 102 may generate a token establishing the identity of the user 104 based on the user credentials. The computing system 102 may transmit, via the network 146, the token to the server 124. The server 124 may validate the token and establish a session with the computing system 102.

During the session, the computing system 102 may also receive an indication of the first agent application command 134 as input from the user. For instance, the indication of the first agent application command 134 may be included in a request for permission to execute the first agent application command 134. The computing system 102 may transmit, via the network 146, the indication of the first agent application command 134 to the server 124. The server 124 may receive, via the network 146, the indication of the first agent application command 134. The server 124 may determine that the user 104 does not belong to the first user type 138 based on the user identifier 144. For instance, the server 124 may identify an entry in a look-up table (not depicted in FIG. 1) that includes user identifiers and respective user types of the user identifiers. The entry may indicate that the user 104 does not belong to the first user type 138. Responsive to determining that the user 104 does not belong to the first user type 138, the server 124 may transmit a request for permission for the user 104 to execute the first agent application command 134 to an administrator device (not depicted in FIG. 1). The request may include the user identifier 144, the first agent application command 134, and an indication of a type of the user 104. In an example, the administrator device may receive an approval of the request from an administrator and the administrator device may transmit the approval of the request to the server 124. Responsive to receiving the approval, the server 124 may assign a permission level 148 to the first agent application command 134. The server 124 may also assign the user identifier 144 to the permission level 148. In an example, the permission level 148 may be destructive, non-destructive, or high-privilege. In some aspects, subsequent to assigning the permission level 148 to the first agent application command 134 and the user identifier 144 to the permission level 148, the server 124 may transmit an indication of the assignments to the computing system 102, whereupon the computing system 102 may present the indication of the assignments to the user 104.

It is further contemplated that the user 104 wishes to execute the first agent application command 134 with respect to the target endpoint 116. For example, a cybersecurity issue (or another issue) may arise with respect to the target endpoint 116 that the user 104 is tasked with addressing. For instance, the user 104 may wish to run a custom script command with respect to the target endpoint 116. The computing system 102 may receive user credentials for the user 104 as input from the user 104. The user credentials may include the user identifier 144 and the password of the user 104. The computing system 102 may transmit, via the network 146 (e.g., the Internet), the user credentials to the server 124. The server 124 may receive, via the network 146, the user credentials. The server 124 may validate the user credentials and establish a session with the computing system 102.

During the session, the computing system 102 may receive, as input to the agent application 110, an indication of the first agent application command 134, that is, the computing system 102 may receive the first agent application command 134 and an identifier for the target endpoint 116. The agent application 110 may transmit, to the server 124 via the network 146, the indication of the first agent application command 134. The server 124 may receive, from the agent application 110 via the network 146, the indication of the first agent application command 134. The server 124 may map the first agent application command 134 to the permission level 148 (which was previously assigned to the first agent application command 134). In some aspects, the first agent application command 134 may be assigned to a string that includes an indication of the first agent application command 134 and the permission level 148, and mapping the first agent application command 134 to the permission level 148 may be based on the string. The server 124 may also determine that the permission level 148 is assigned to the user identifier 144 of the user 104. The server 124 may enable the agent application 110 to execute the first agent application command 134 with respect to the target endpoint 116 based on the aforementioned mapping and determination, even when the user 104 does not belong to the first user type 138.

In some aspects pertaining to enabling the agent application 110 to execute the first agent application command 134 with respect to the target endpoint 116, responsive to performing the aforementioned mapping and determination, the server 124 may transmit, to the sensor application 122, an indication of the first agent application command 134. The sensor application 122 of the target endpoint 116 may execute the first agent application command 134. The sensor application 122 may transmit, to the server 124 via the network 146, an indication that the first agent application command 134 has been executed. In some examples, the indication that the first agent application command 134 has been executed may include results of executing the first agent application command 134. The server 124 may receive the indication from the sensor application 122 via the network 146. The server 124 may transmit, via the network 146, the indication to the agent application 110, whereupon the agent application 110 may present the indication to the user 104. For example, the agent application 110 may present, to the user 104, the results of executing the first agent application command 134 with respect to the target endpoint 116.

In some other aspects pertaining to enabling the agent application 110 to execute the first agent application command 134 with respect to the target endpoint 116, responsive to performing the aforementioned mapping and determination, the server 124 may transmit, to the sensor application 122, an indication that the agent application 110 has permission to execute the first agent application command 134. In some aspects, the indication that the agent application 110 has permission to execute the first agent application command 134 may include the user identifier 144 of the user 104. The server 124 may also transmit, to the agent application 110, information that enables the agent application 110 to execute the first agent application command 134 with respect to the target endpoint 116. The agent application 110 may transmit, to the target endpoint 116 via the network 146, the first agent application command 134, the information, and the user identifier 144. The sensor application 122 may receive, from the computing system 102 via the network 146, the first agent application command 134, the information, and the user identifier 144. The sensor application 122 of the target endpoint 116 may execute the first agent application command 134 based on the indication that the agent application 110 has permission to execute the first agent application command 134, the information, and/or the user identifier 144. The sensor application 122 may transmit, to the computing system 102 via the network 146, an indication that the first agent application command 134 has been executed. In some examples, the indication that the first agent application command 134 has been executed may include results of executing the first agent application command 134. The computing system 102 may receive, from the target endpoint 116 via the network 146, the indication that the first agent application command 134 has been executed, whereupon the agent application 110 may present the indication to the user 104. For example, the agent application 110 may present, to the user 104, the results of executing the first agent application command 134 with respect to the target endpoint 116.

Although the description above describes the computing system 102 requesting permission for the user 104 to execute the first agent application command 134, other possibilities are contemplated. In some aspects, an administrator device operated by an administrator may establish a session with the server 124. The server 124 may receive, from the administrator device, the user identifier 144 for the user 104 and the indication of the first agent application command 134. The server 124 may assign the permission level 148 to the first agent application command 134 and assign the user identifier 144 to the permission level 148 as described above.

Users may be assigned access to a group of commands which enables the users to execute all commands in the group or none of the commands in the group. This may lead to an issue in which an analyst cannot be granted permission to run a specific command as part of their responsibilities without also giving the analyst access to other commands in the group. In an example, command group 1 may include command A and command B, command group 2 may include command P and command Q, and command group 3 may include command X and command Y. In the example, command group 1 may be assigned permission level 1, command group 2 may be assigned permission level 2, and command group 3 may be assigned permission level 3. Following the example, the analyst may have access to execute all commands in command group 1, all commands in command group 2, and/or all commands in command group 3. However, if command X is the only command that the analyst needs to perform their responsibilities, the analyst may also have access to command Y as well. If command Y enables a user to run executables or terminate processes, this may expose an organization to an insider threat risk. As such, some techniques for access control for commands being run on a system do not allow for fine-grained control. For instance, existing systems may not offer fine-grained access to commands being run on a system via an agent application. Thus, users may be able to access all commands or some commands via role-based access groups, but specific commands may not be assigned to users.

Various technologies pertaining to fine-grained access to system commands run via an installed agent application are described herein. In some aspects described herein, each command is assigned to a specific permission string that may be used to provide a user with access to a specific command. For instance, following the example described above, command A may be assigned to permission string A, command B may be assigned to permission string B, command P may be assigned to permission string P, command Q may be assigned to permission string Q, command X may be assigned to permission string X, and command Y may be assigned to permission string Y. In an example, an organization may assign command X to a user who needs to use command X (but not command Y) to perform their responsibilities. Assigning commands in such a manner may minimize insider threat risks while offering customization aligned with specific access preferences of the organization.

Figure 2:
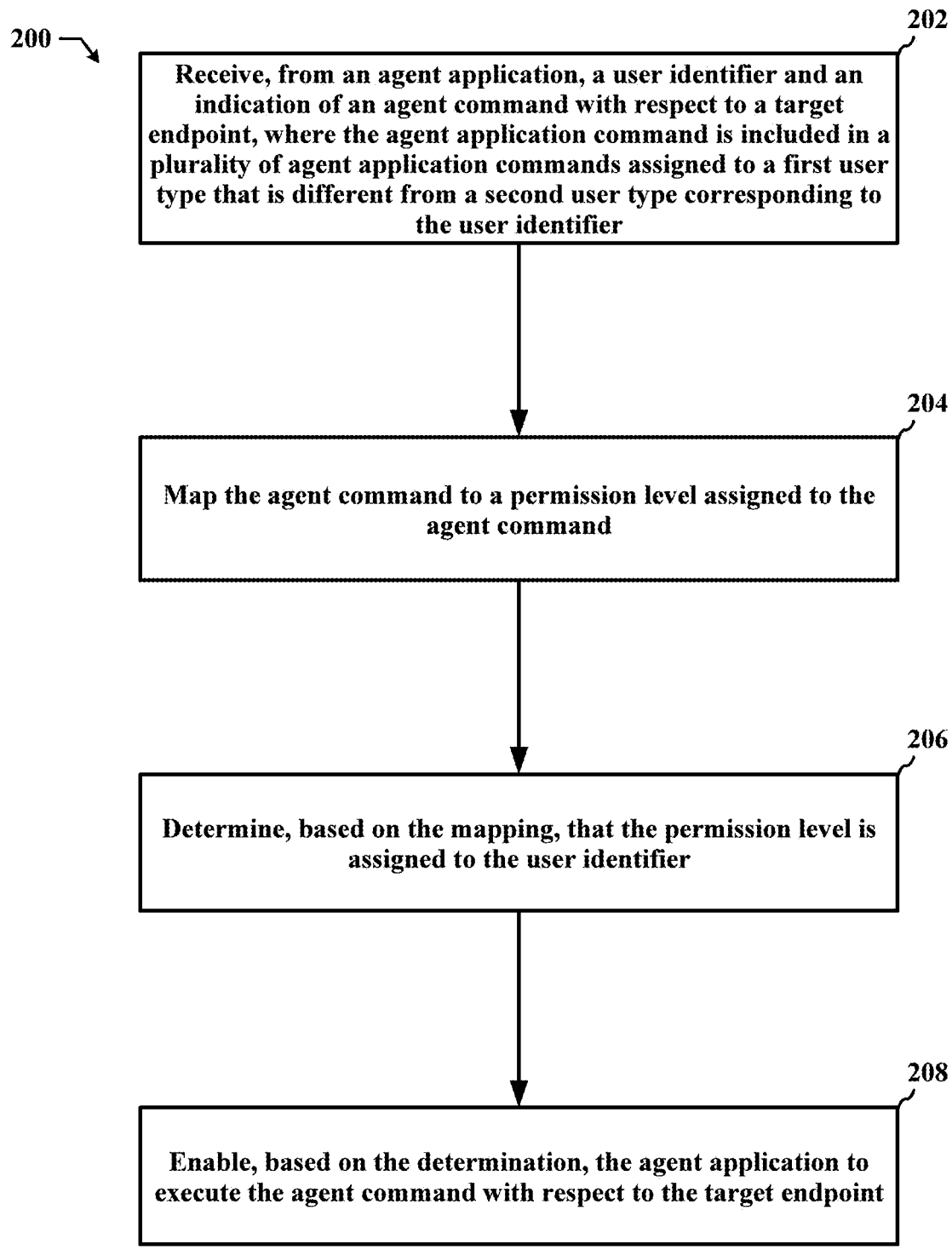
FIG. 2 is a flow diagram of a method of fine-grained access to system commands in accordance with some aspects of the present disclosure.

FIG. 2 is a flow diagram 200 of a method for fine-grained access to system commands in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the processing device 126 (shown in FIG. 1), the processing device 404 (shown in FIG. 4), the processing device 502 (shown in FIG. 5), or a combination thereof.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 202, a processing device receives, from an agent application, a user identifier and an indication of an agent application command with respect to a target endpoint, where the agent application command is included in a plurality of agent application commands assigned to a first user type that is different from a second user type corresponding to the user identifier. In an example, the user identifier may be or include the user identifier 144, the agent application command may be or include the first agent application command 134, and the target endpoint may be or include the target endpoint 116. In another example, the user identifier may be or include the user identifier 412, the agent application command may be or include the agent application command 414, and the target endpoint may be or include the target endpoint 416.

At block 204, the processing device maps the agent application command to a permission level assigned to the agent application command. In an example, the permission level may be or include the permission level 148. In another example, the permission level may be or include the permission level 418.

At block 206, the processing device determines, based on the mapping, that the permission level is assigned to the user identifier. In an example, the permission level 148 may be assigned to the user identifier 144. In another example, the permission level 418 may be assigned to the user identifier 412.

At block 208, the processing device enables, based on the determination, the agent application to execute the agent application command with respect to the target endpoint. For example, the agent application 110 may execute the first agent application command 134 with respect to the target endpoint 116. In another example, the agent application 410 may execute the agent application command 414 with respect to the target endpoint 416.

Figure 3:
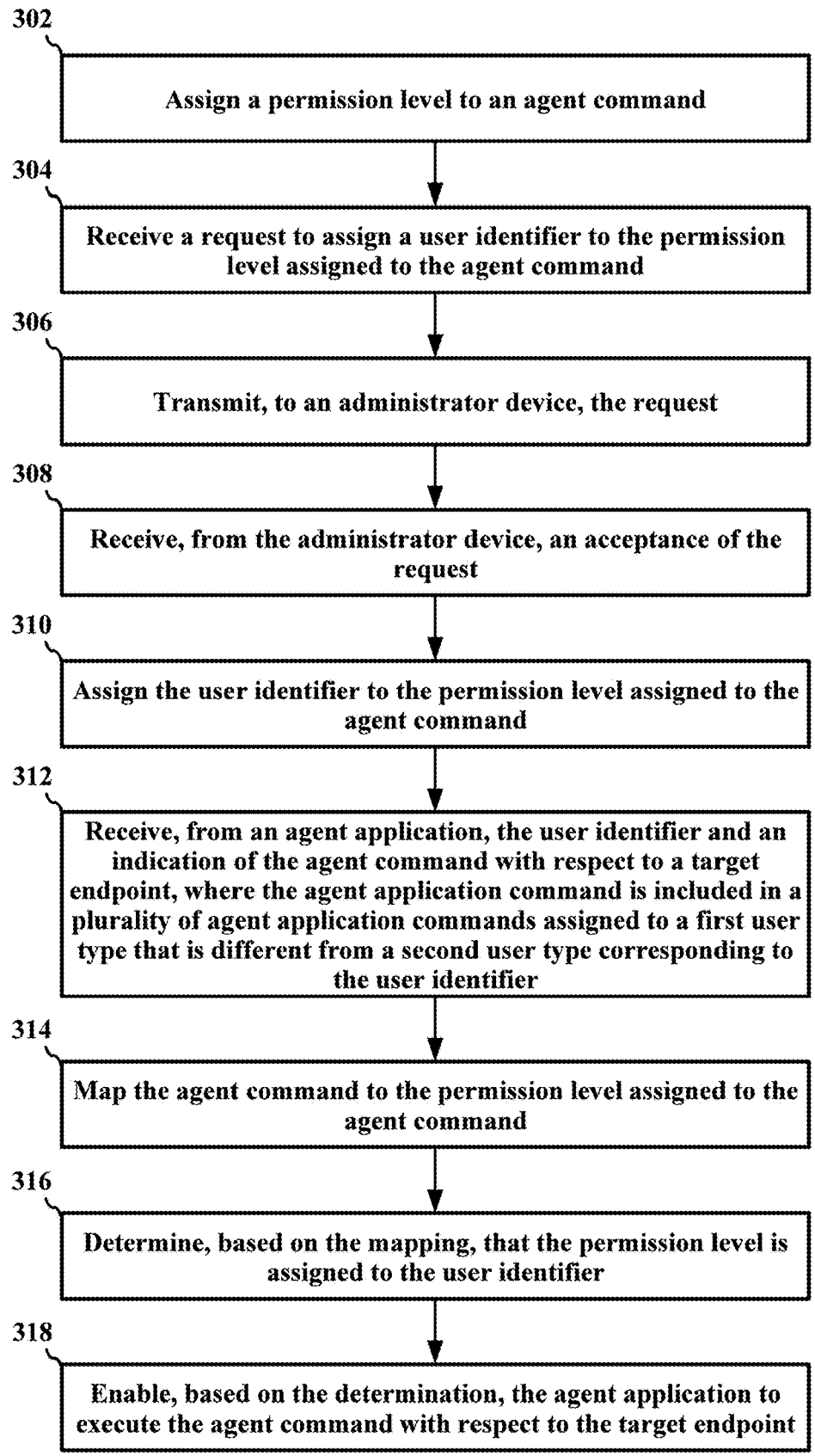
FIG. 3 is a flow diagram of a method of fine-grained access to system commands in accordance with some aspects of the present disclosure.

FIG. 3 is a flow diagram 300 of a method for fine-grained access to system commands in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the processing device 126 (shown in FIG. 1), the processing device 404 (shown in FIG. 4), the processing device 502 (shown in FIG. 5), or a combination thereof.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 302, a processing device may assign a permission level to an agent application command (e.g., prior to receiving a user identifier and an indication of the agent application command from an agent application). For example, the permission level may be or include the permission level 148 and the agent application command may be or include the first agent application command 134. In another example, the permission level may be or include the permission level 418 and the agent application command may be or include the agent application command 414.

At block 304, the processing device may receive a request to assign a user identifier to the permission level assigned to the agent application command. For example, the user identifier may be or include the user identifier 144. In another example, the user identifier may be or include the user identifier 412.

At block 306, the processing device may transmit, to an administrator device, the request. For example, transmitting the request to the administrator device may correspond to the description of FIG. 1 above.

At block 308, the processing device may receive, from the administrator device, an acceptance of the request. For example, receiving the acceptance of the request may correspond to the description of FIG. 1 above.

At block 310, the processing device may assign the user identifier to the permission level assigned to the agent application command. For example, the user identifier 144 may be assigned to the permission level 148.

At block 312, the processing device receives, from an agent application, the user identifier and an indication of the agent application command with respect to a target endpoint, where the agent application command is included in a plurality of agent application commands assigned to a first user type that is different from a second user type corresponding to the user identifier. For example, the target endpoint may be or include the target endpoint 116. In another example, the target endpoint may be or include the target endpoint 416. In an example, the agent application may be or include the agent application 110. In another example, the agent application may be or include the agent application 410.

At block 314, the processing device maps the agent application command to the permission level assigned to the agent application command. For example, the first agent application command 134 may be mapped to the permission level 148. In another example, the agent application command 414 may be mapped to the permission level 418.

At block 316, the processing device determines, based on the mapping, that the permission level is assigned to the user identifier. For example, the permission level 148 may be assigned to the user identifier 144. In another example, the permission level 418 may be mapped to the user identifier 412.

At block 318, the processing device enables, based on the determination, the agent application to execute the agent application command with respect to the target endpoint. For example, enabling the agent application to execute the agent application command with respect to the target endpoint may correspond to the description of FIG. 1 above.

In some aspects, enabling the agent application to execute the agent application command with respect to the target endpoint may include transmitting, to a sensor application on the target endpoint, the indication of the agent application command; receiving, from the target endpoint, an indication of an execution of the agent application command; and transmitting, to the agent application, the indication of the execution of the agent application command. For example, the aforementioned aspects may correspond to the description of FIG. 1 above. In an example, the sensor application may be or include the sensor application 122.

In some aspects, the agent application command may be assigned to a string comprising the indication of the agent application command and the permission level, and mapping the agent application command to the permission level may be based on the string. For example, the aforementioned aspects may correspond to the description of FIG. 1 above.

In some aspects, determining that the permission level is assigned to the user identifier may be based on the assignment of the permission level to the agent application command. For example, the aforementioned aspects may correspond to the description of FIG. 1 above.

In some aspects, the agent application command may include at least one of: a read-only command, a file extraction command, a state modifying command, a preconfigured script running command, a custom script running command, an upload command, a download command, or an executable running command. In an example, the first agent application command 134 may include at least one of: a read-only command, a file extraction command, a state modifying command, a preconfigured script running command, a custom script running command, an upload command, a download command, or an executable running command. In another example, the agent application command 414 may include at least one of: a read-only command, a file extraction command, a state modifying command, a preconfigured script running command, a custom script running command, an upload command, a download command, or an executable running command.

In some aspects, enabling the agent application to execute the agent application command with respect to the target endpoint may include transmitting, to a sensor application on the target endpoint, an indication that the agent application has permission to execute the agent application command. For example, the sensor application may be or include the sensor application 122. For example, the aforementioned aspects may correspond to the description of FIG. 1 above.

In some aspects, the agent application may include a cybersecurity agent application, and the agent application command may include a cybersecurity-associated command. For example, the agent application 110 may be a cybersecurity agent application, and the first agent application command 134 may include a cybersecurity-associated command. In another example, the agent application 410 may be a cybersecurity agent application, and the agent application command 414 may include a cybersecurity-associated command.

Figure 4:
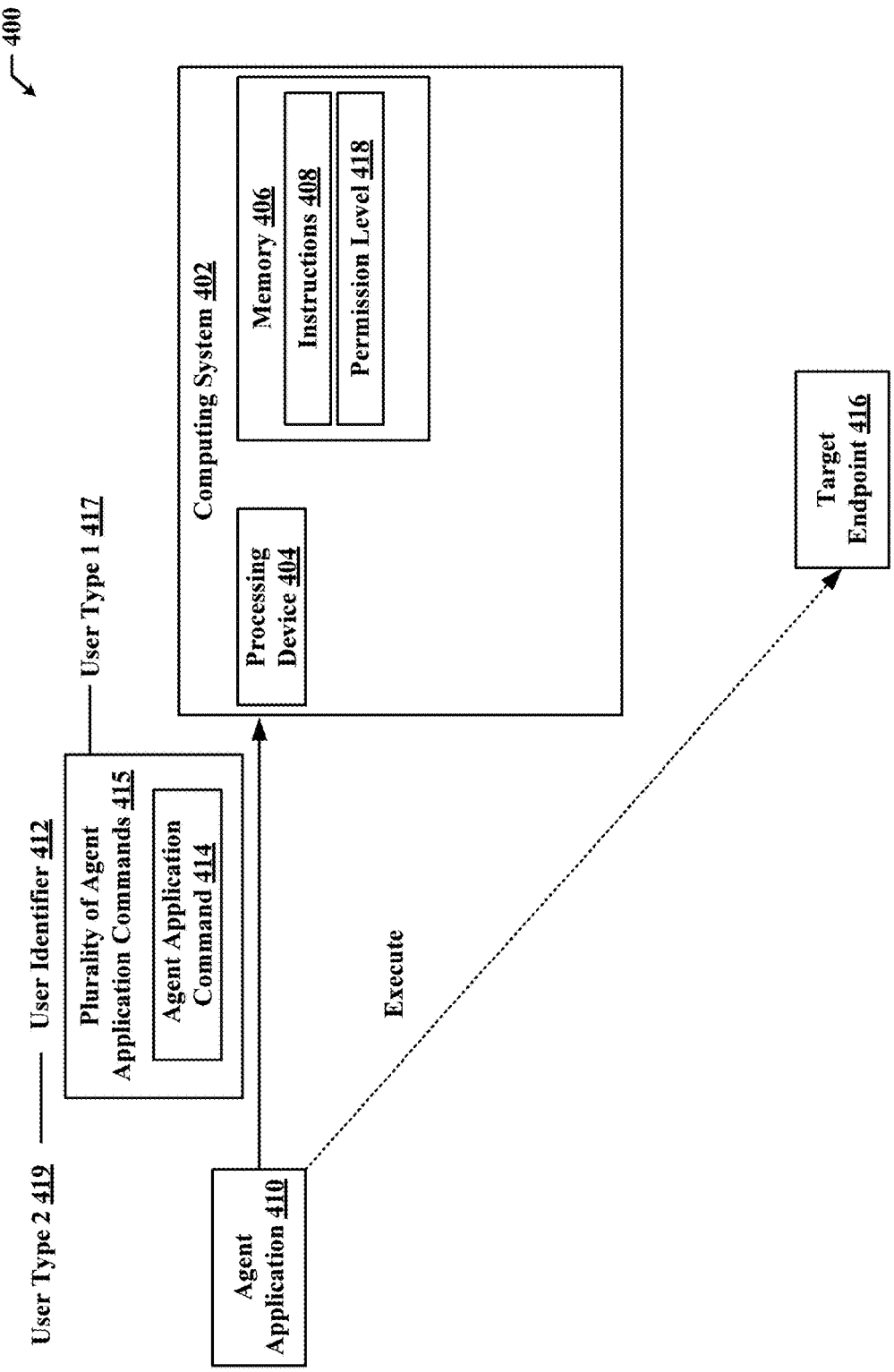
FIG. 4 is a block diagram that illustrates an example of a system for fine-grained access to system commands in accordance with some aspects of the present disclosure.

FIG. 4 is a block diagram 400 that illustrates an example of a computing system 402 for fine-grained access to system commands in accordance with some aspects of the present disclosure. In some aspects, the computing system 402 may perform some or all of the functionality described herein. The computing system 402 includes a processing device 404 and memory 406. The memory 406 stores instructions 408 that are executed by the processing device 404. The instructions 408, when executed by the processing device 404, cause the processing device 404 to receive, from an agent application 410, a user identifier 412 and an indication of an agent application command 414 with respect to a target endpoint 416, where the agent application command 414 is included in a plurality of agent application commands 415 assigned to a first user type 417 that is different from a second user type 419 corresponding to the user identifier 412. The instructions 408, when executed by the processing device 404, cause the processing device 404 to map the agent application command 414 to a permission level 418 assigned to the agent application command 414. The instructions 408, when executed by the processing device 404, cause the processing device 404 to determine, based on the mapping, that the permission level 418 is assigned to the user identifier 412. The instructions 408, when executed by the processing device 404, cause the processing device 404 to enable, based on the determination, the agent application 410 to execute the agent application command 414 with respect to the target endpoint 416.

Figure 5:
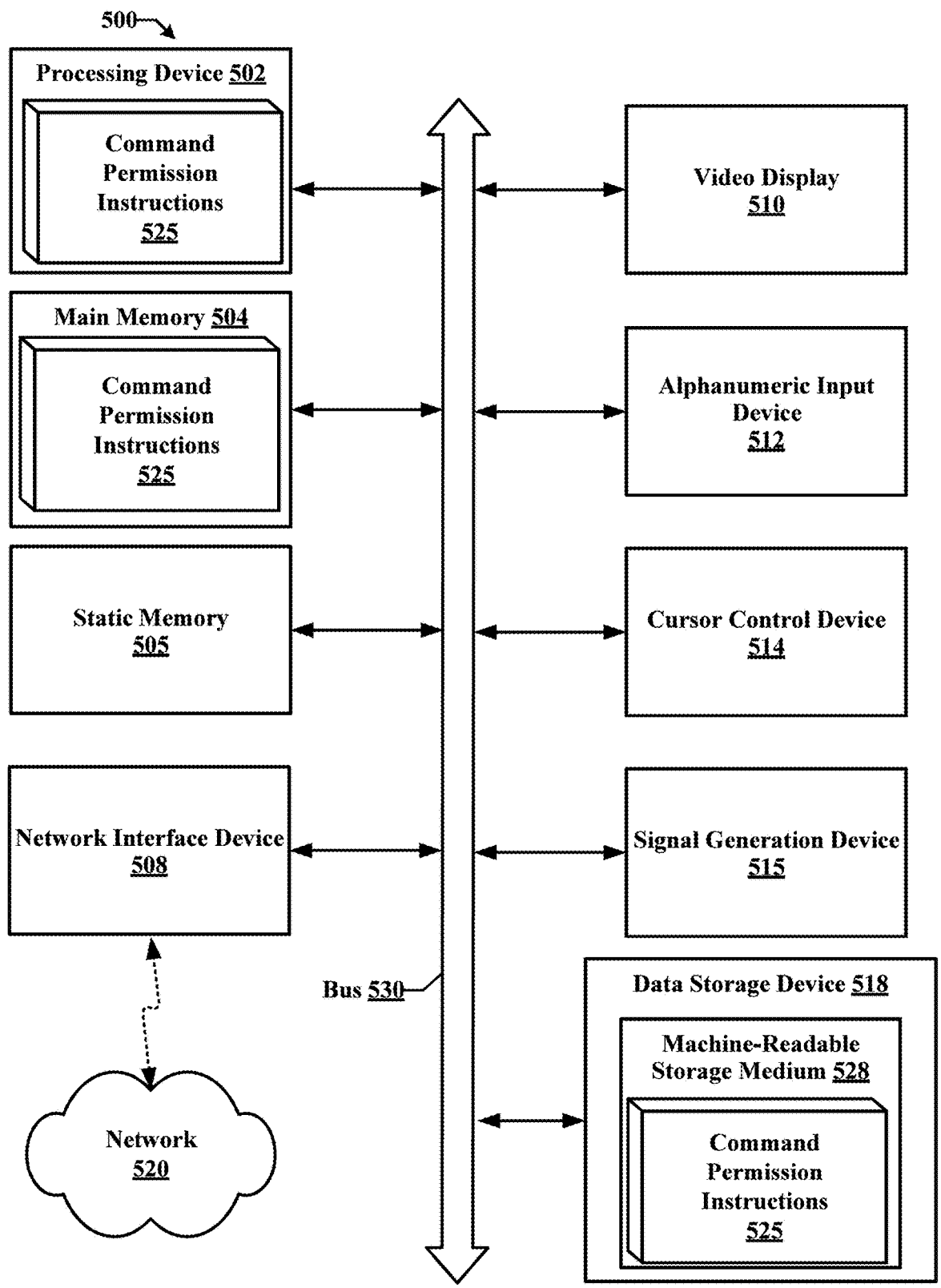
FIG. 5 illustrates a diagrammatic representation of a machine in an example form of a computer system that may perform one or more of the operations described herein in accordance with some aspects of the present disclosure.

FIG. 5 illustrates a diagrammatic representation of a machine in the example form of a computer system 500 within which a set of instructions, for causing the machine to perform any one or more of the methodologies discussed herein for fine-grained access to system commands.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, the computer system 500 may be representative of a server.

The computer system 500 includes a processing device 502, a main memory 504 (e.g., read-only memory (ROM), flash memory, dynamic random access memory (DRAM), a static memory 505 (e.g., flash memory, static random access memory (SRAM), etc.), and a data storage device 518 which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

The computer system 500 may further include a network interface device 508 which may communicate with a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 515 (e.g., an acoustic signal generation device, such as a speaker). In some embodiments, the video display unit 510, the alphanumeric input device 512, and the cursor control device 514 may be combined into a single component or device (e.g., an LCD touch screen).

The processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute command permission instructions 525, for performing the operations and steps discussed herein. For example, the command permission instructions 525 may include instructions for receiving, from an agent application, a user identifier and an indication of an agent application command with respect to a target endpoint, where the agent application command is included in a plurality of agent application commands assigned to a first user type that is different from a second user type corresponding to the user identifier. The command permission instructions 525 may include instructions for mapping the agent application command to a permission level assigned to the agent application command. The command permission instructions 525 may include instructions for determining, based on the mapping, that the permission level is assigned to the user identifier. The command permission instructions 525 may include instructions for enabling, based on the determination, the agent application to execute the agent application command with respect to the target endpoint.

The data storage device 518 may include a machine-readable storage medium 528 that stores the command permission instructions 525 (e.g., software) embodying any one or more of the methodologies of functions described herein. The command permission instructions 525 may also reside, completely or at least partially, within the main memory 504 or within the processing device 502 during execution thereof by the computer system 500; the main memory 504 and the processing device 502 also constituting machine-readable storage media. The command permission instructions 525 may further be transmitted or received over a network 520 via the network interface device 508.

While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "transmitting," "mapping," "enabling," "assigning," "inputting," "outputting," "obtaining," "determining," "selecting," "identifying," "storing," "executing," "permitting," "allowing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission, or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:
   receiving, from an agent application, a user identifier and an indication of an agent application command with respect to a target endpoint, wherein the agent application command is included in a plurality of agent application commands assigned to a first user type that is different from a second user type corresponding to the user identifier;
   determining that the second user type lacks permission to execute the plurality of agent application commands assigned to the first user type;
   mapping, by a processing device, the agent application command to a permission level assigned to the agent application command based on the determination that the second user type lacks the permission;
   determining, based on the mapping, that the permission level is assigned to the user identifier; and
   enabling, based on the determination that the second user type lacks the permission to execute the plurality of agent application commands and based the determination that the permission level is assigned to the user identifier, the agent application to execute the agent application command with respect to the target endpoint.

2. The method of claim 1, wherein the agent application comprises a cybersecurity agent application, and wherein the agent application command comprises a cybersecurity-associated command.

3. The method of claim 1, wherein the enabling the agent application to execute the agent application command with respect to the target endpoint comprises:
   transmitting, to a sensor application on the target endpoint, the indication of the agent application command;
   receiving, from the target endpoint, an indication of an execution of the agent application command; and
   transmitting, to the agent application, the indication of the execution of the agent application command.

4. The method of claim 1, wherein the agent application command is assigned to a string comprising the indication of the agent application command and the permission level, and wherein the mapping the agent application command to the permission level is based on the string.

5. The method of claim 1, further comprising:
   assigning the permission level to the agent application command prior to the receiving the user identifier and the indication of the agent application command from the agent application, wherein the determination that the permission level is assigned to the user identifier is based on the assignment.

6. The method of claim 1, further comprising:
   receiving a request to assign the user identifier to the permission level assigned to the agent application command;
   transmitting, to an administrator device, the request;
   receiving, from the administrator device, an acceptance of the request; and
   assigning the user identifier to the permission level assigned to the agent application command, wherein the determination that the permission level is assigned to the user identifier is based on the assignment.

7. The method of claim 1, wherein the agent application command comprises a read-only command.

8. The method of claim 1, wherein the agent application command comprises at least one of:
   a file extraction command;
   a state modifying command; or
   a preconfigured script running command.

9. The method of claim 1, wherein the agent application command comprises at least one of:
   a custom script running command;
   an upload command;
   a download command; or
   an executable running command.

10. The method of claim 1, wherein the enabling the agent application to execute the agent application command with respect to the target endpoint comprises:
    transmitting, to a sensor application on the target endpoint, an indication that the agent application has permission to execute the agent application command.

11. A system, comprising:
    a processing device; and
    a memory to store instructions that, when executed by the processing device, cause the processing device to:
       receive, from an agent application, a user identifier and an indication of an agent application command with respect to a target endpoint, wherein the agent application command is included in a plurality of agent application commands assigned to a first user type that is different from a second user type corresponding to the user identifier;
       determine that the second user type lacks permission to execute the plurality of agent application commands assigned to the first user type;
       map the agent application command to a permission level assigned to the agent application command based on the determination that the second user type lacks the permission;
       determine, based on the mapping, that the permission level is assigned to the user identifier; and
       enable, based on the determination that the second user type lacks the permission to execute the plurality of agent application commands and based the determination that the permission level is assigned to the user identifier, the agent application to execute the agent application command with respect to the target endpoint.

12. The system of claim 11, wherein the agent application command comprises a read-only command.

13. The system of claim 11, wherein the agent application comprises a cybersecurity agent application, and wherein the agent application command comprises a cybersecurity-associated command.

14. The system of claim 11, wherein the instructions, when executed by the processing device, further cause the processing device to:
    assign the permission level to the agent application command prior to the reception of the user identifier and the indication of the agent application command from the agent application, wherein the determination that the permission level is assigned to the user identifier is based on the assignment.

15. The system of claim 11, wherein the agent application command comprises at least one of:

a file extraction command;
a state modifying command; or
a preconfigured script running command.

16. The system of claim 11, wherein the agent application command comprises at least one of:
a custom script running command;
an upload command;
a download command; or
an executable running command.

17. A non-transitory computer readable medium, having instructions stored thereon which, when executed by a processing device, cause the processing device to:
receive, from an agent application, a user identifier and an indication of an agent application command with respect to a target endpoint, wherein the agent application command is included in a plurality of agent application commands assigned to a first user type that is different from a second user type corresponding to the user identifier;
determining that the second user type lacks permission to execute the plurality of agent application commands assigned to the first user type;
map, by the processing device, the agent application command to a permission level assigned to the agent application command based on the determination that the second user type lacks the permission;
determine, based on the mapping, that the permission level is assigned to the user identifier; and
enable, based on the determination that the second user type lacks the permission to execute the plurality of agent application commands and based the determination that the permission level is assigned to the user identifier, the agent application to execute the agent application command with respect to the target endpoint.

18. The non-transitory computer readable medium of claim 17, wherein the agent application command comprises at least one of:
a file extraction command;
a state modifying command; or
a preconfigured script running command.

19. The non-transitory computer readable medium of claim 17, wherein the agent application comprises a cybersecurity agent application, and wherein the agent application command comprises a cybersecurity-associated command.

20. The non-transitory computer readable medium of claim 17, wherein
the instructions, when executed by the processing device, cause the processing device further to:
assign the permission level to the agent application command prior to the reception of the user identifier and the indication of the agent application command from the agent application, wherein the determination that the permission level is assigned to the user identifier is based on the assignment.

* * * * *